United States Patent [19]

Rogers

[11] Patent Number: 5,321,439
[45] Date of Patent: Jun. 14, 1994

[54] VEHICLE HEADLIGHT TESTING SYSTEM

[75] Inventor: John N. Rogers, Tucson, Ariz.

[73] Assignee: Environmental Systems Products, Inc., East Granby, Conn.

[21] Appl. No.: 960,692

[22] Filed: Oct. 14, 1992

[51] Int. Cl.⁵ .............................................. H04N 7/18
[52] U.S. Cl. ..................................... 348/135; 356/121
[58] Field of Search ................. 358/93, 107; 356/121; H04N 7/18

[56] References Cited

U.S. PATENT DOCUMENTS 4,120,589 10/1978 Mima .................................... 356/121
4,609,939 9/1986 Kozawa ............................... 358/107
4,634,275 1/1987 Yoshida ............................... 358/107

OTHER PUBLICATIONS

Hopkins Manufacturing Corp., "Fractional Balance Vision I Headlamp Aimer" brochure 1991.

Weaver Corporation, "The Headlight Testers" brochure, date unknown.

Primary Examiner—Howard W. Britton
Attorney, Agent, or Firm—Schweitzer Cornman & Gross

[57] ABSTRACT

A headlight testing system includes a target screen upon which an image of headlight illumination is projected. Reference indicia for intensity and positioning are also placed upon the screen. A video camera captures an electrical image of the screen, which is digitized to allow for analysis thereof. A second video camera is directed at the vehicle headlights, its generated image similarly being digitized. The digitized data are processed, reference being made to the reference indicia, to determine positioning and intensity of the headlights. An overhead monitor, viewable from the vehicle may be utilized to provide information to an operator positioned within the vehicle under test, the operator communicating with the system by a wireless link communications.

17 Claims, 3 Drawing Sheets

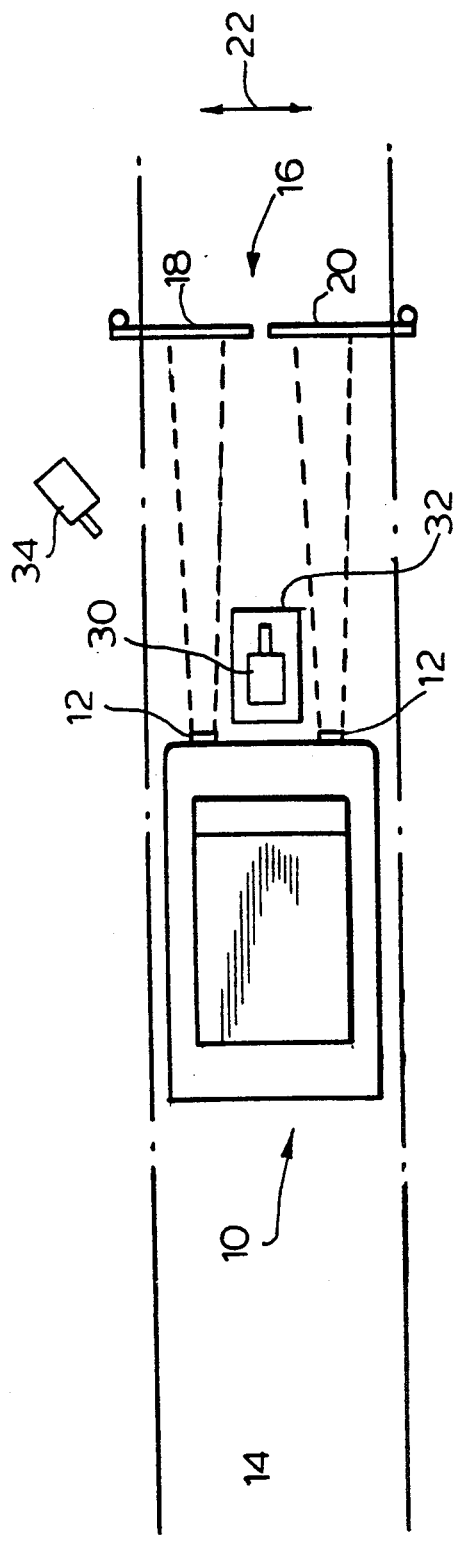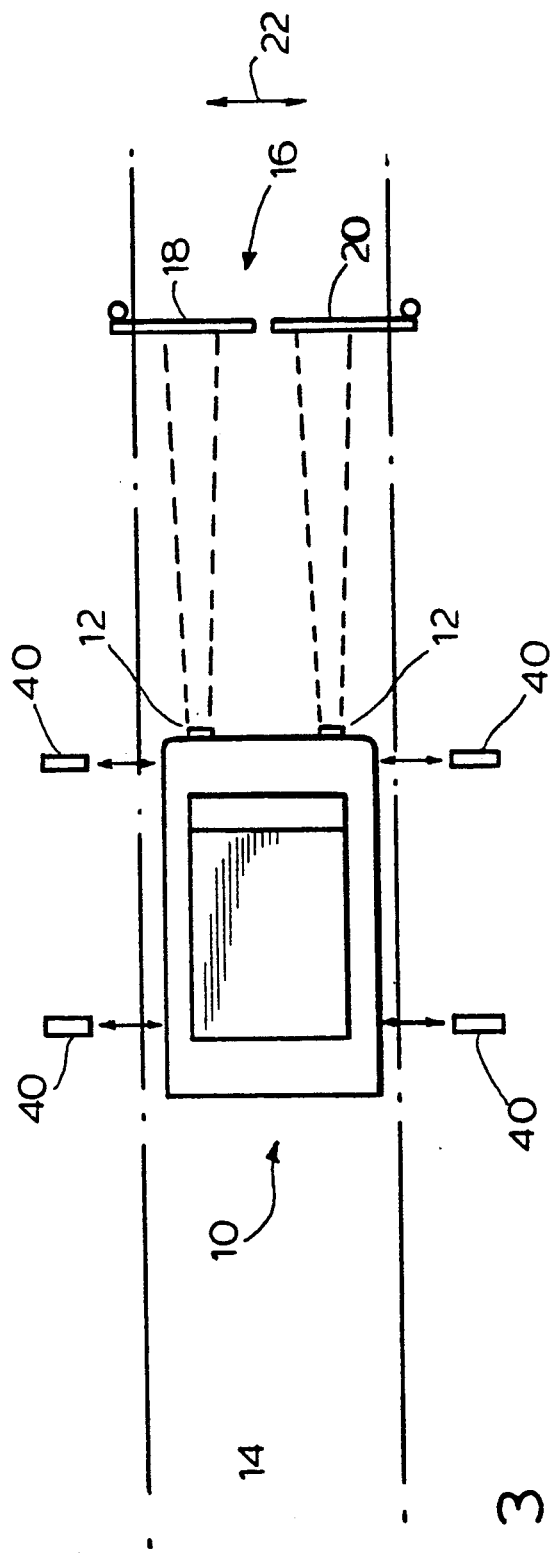
FIG. 2
FIG. 3

VEHICLE HEADLIGHT TESTING SYSTEM

A present invention relates to a method for testing the alignment and intensity of automobile headlights and an apparatus for carrying out the method.

BACKGROUND OF THE INVENTION

Automobile safety testing, as mandated by state authorities and as may be employed to maintain an automobile in proper operating condition, includes a plurality of procedures which test a variety of the operating systems of the vehicle. To provide increased test facility throughput, as well as to provide more accuracy and consistency in the testing procedures, there has been an emphasis on automated test programs and routines. Present day test facilities are accordingly increasingly automated, with many test functions being carried out under the control of a computerized test system.

The checking of headlights for alignment and output is often a component of such test routines. It has heretofore been difficult, however, to develop and adapt automated procedures to such headlight testing. Typically, manual test equipment has been unsuccessfully adapted to automated systems. Such attempts have failed to sufficiently automate the procedure, and still require significant operator intervention and accordingly introduce the risk of significant error into the procedure.

It is accordingly a purpose of the present invention to provide an automated system for automobile headlight testing which avoids the shortcoming of the prior art.

A further purpose of the present invention is to provide an automated headlight testing system and apparatus which can be implemented and utilized without the need for significant operator assistance. Still another object of the present invention is to provide such a test system and apparatus which allows headlight testing to be performed in a rapid manner.

Yet another object of the invention is to provide a headlight test system which can easily compensate for variations in headlight location, and which is adaptable for a wide variety of headlight configurations and positioning.

Another object of the invention is to provide a headlight test system which can be incorporated into or utilized in association with automated vehicle test apparatus.

BRIEF DESCRIPTION OF THE INVENTION

In accordance with the foregoing and other objects and purposes, a vehicle test station is provided having one or more vehicle test lanes for accommodation of vehicles for testing. With the vehicle driven into a test position on the lane, a target surface onto which the headlight beams are to be projected is positioned in front of the vehicle. The headlight images on the target surface are monitored by a video camera. The electrical image of the target surface generated by the camera is analyzed by an appropriate processor unit, whereby the intensity and positioning of the headlight beam images is determined. Reference points on the target surface are provided, their images being recorded along with the headlight images to permit the headlight beam images to be precisely located on the target and correlated to known intensities.

A second video camera, adapted and located to provide an image of the front of the vehicle under test, provides data whereby headlight position can be determined. With headlight and image locations and intensities being calculated, intensity and alignment checks for the headlights can be performed by the processor.

With appropriate use of sensor technology, the vehicle can be positioned in front of the target within relatively wide guidelines, the system determining and compensating for precise position of the vehicle and compensating for any misalignment for the reference position. Thus, precise manual positioning is not required, the system being adapted to accommodate variations and provide a standardized output irrespective of such variations.

BRIEF DESCRIPTION OF THE DRAWINGS

A more complete understanding of the present invention will be obtained upon review of the following detailed description of a preferred, but nonetheless illustrative, embodiment of the invention when reviewed in association with the annexed drawings, wherein:

FIG. 2 is a top plan view of the embodiment of FIG. 1;

FIG. 3 is a top plan view of an alternative embodiment; and

DETAILED DESCRIPTION OF THE INVENTION

Figure 1:
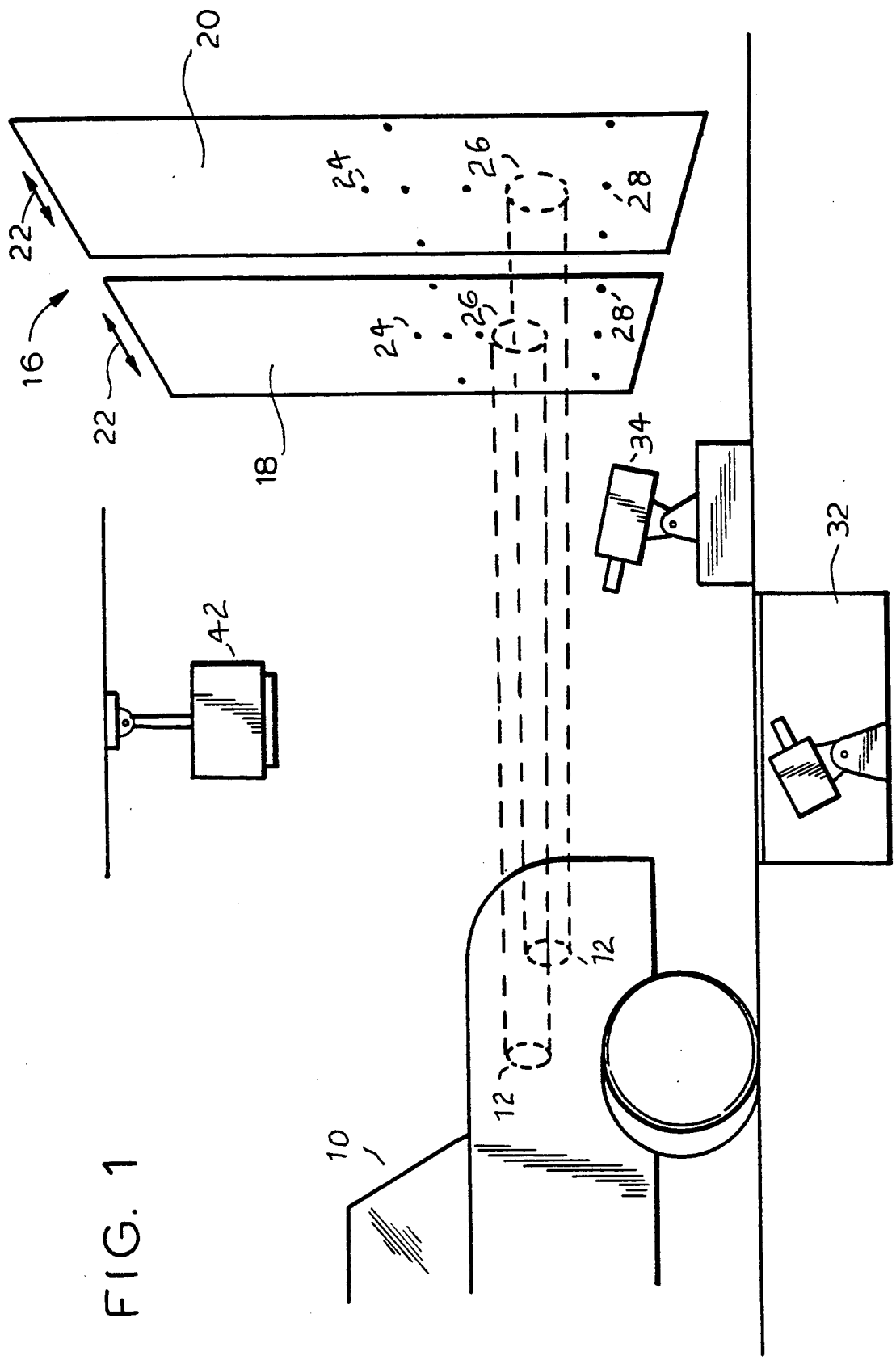
FIG. 1 is a side perspective view of the apparatus of the present invention.

As presented in the Figures, A vehicle 10 having headlights 12 is positioned within a test zone or area generally identified by lane 14. The area may be reserved for headlight testing exclusively, or may be incorporated into a more generalized testing bay configuration. As shown in the Figures, the headlights 12 include individual right and left lamps, but it is to be recognized that the vehicle may include either multiple element lamps or pairs of lamps on each side to provide both "normal" and "high beam" right and left headlight illumination. Typically, the test lane 14 may be provided with appropriate markers (not shown) to provide general guidelines for the lateral and longitudinal positioning of the vehicle in the lane.

With the vehicle in position on the lane a target surface or screen 16 is placed in front of the vehicle. In a preferred embodiment the target screen 16 may comprise a pair of doors 18, 20, which may be of the "barn door" variety, slidable along a horizontal axis perpendicular to the main axis of the lane 14 as shown by the arrows 22 such that they may be positioned for a test, as shown in the Figures, or retracted from the test lane 14 to allow the automobile to drive forward when the test is completed. Other alternatives are within the contemplation of the invention, including pivoting doors, as well as screens which may be lowered from an overhead position. The target may be provided with appropriate stop/or sensor means to insure that, when positioned for a test, it is in a known, predefined reference position. The surface of the target screen may be a matte white finish.

The target screen 16 is provided with a plurality of position indicator points or indicia 24, which may be in the form of small indicator lamps providing point illumination. Each of the indicators is at a known position on the screen. With the screen being positioned at a predetermined location, the indicia provide a coordinate system to permit the location of the headlight images 26 projected upon the screen to be determined. In addition, a plurality of intensity reference images 28 are also provided on the target proximate each headlight image. These images are of known intensity, and provide intensity reference values for the system. It is to be recognized that the location indicia and intensity reference images may be generated by separate means, or may be incorporated together. Further, the intensity reference images may be generated by lights mounted upon the screen, or by the projection of images from lights mounted, for example, adjacent the test lane.

A first video camera 30 is positioned to focus on the target screen 16. As shown, the camera may be located in a pit 32 or may otherwise be suitably aimed at the target. A second video camera 34, typically mounted on a pedestal at the edge of the lane 14 adjacent or forward of the screen 16, is focused upon the front of the vehicle, and provides an image of the headlights.

Figure 4:
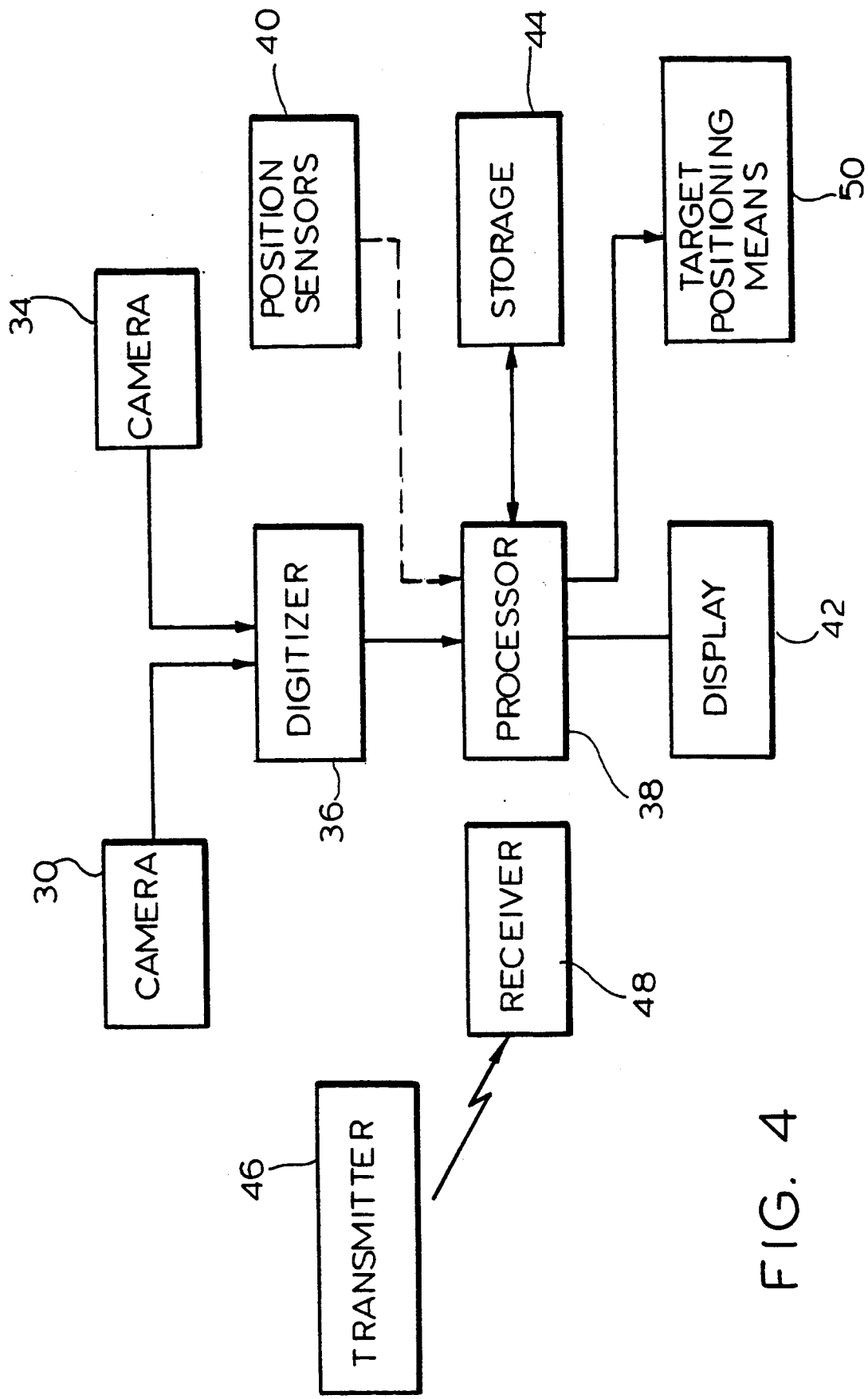
FIG. 4 is a block diagram of the major components of the invention.

As shown in FIG. 4, the video outputs of both cameras are fed to a digitizer 36, which captures a frame image and provides a digital format output representation of the captured image. Processor 38 analyzes the target image from camera 30 to determine the center of the light pattern for each headlight as projected upon the target. Those positions are determined and compared with the image positions of the reference points 28. As the precise positions of the reference points on the target are known, and the spatial orientation of the target itself is known, an exact location for the headlight beam images can be determined. Typically, the point of maximum intensity of the headlight image may be utilized to define the headlight "position".

The processor further determines the intensity of the headlight beam by comparison to the recorded and digitized images of intensity reference images 28, whose intensity values are known. Intensity may be determined, for example, at the point of maximum headlight image intensity, or a relative or average value may be obtained through integration or averaging techniques across the spread of the headlight image.

The digital representation of the image from camera 34 projected at the headlights is similarly processed by processor 38 to determine the points of maximum intensity for the headlights. Such points are utilized to determine the height above the floor of the headlights, as well as the distance between them. Processor 38 then associates this information with the screen image data to determine whether the focus and intensity of the headlights are within appropriate guidelines. By incorporating automatic focus capabilities into the camera, the distance to the front of the vehicle from the known position and angle of the camera can be determined and thus utilized for calculation of headlight height and separation as well as for calculation of distance from the headlights to the target screen.

To further insure accurate orientation of the vehicle, sensors 40, as depicted in FIG. 3, may be utilized. Such sensors are in the nature of ranging devices, as known in the art, which may operate on either optical or echo ranging techniques. In a preferred embodiment four sensors are utilized, two on each side of the vehicle, positioned proximate to the front and rear of the vehicle. Each pair of front and rear sensors are arranged parallel to the screen. The distances to the vehicle are fed to processor 38, as seen in FIG. 4, which calculates whether the vehicle is aligned perpendicular to the screen and the amount of deviation. Small errors in alignment can thus be compensated for in the processing of the image data. Where vehicle alignment exceeds certain predetermined guidelines, the processor may issue an appropriate instruction to have the operator re-align the vehicle more closely parallel and centered as required.

Towards that end, an overhead monitor display 42 is provided. In addition to providing notification to the operator to re-align the vehicle, the monitor can provide other instructions, including instructions to drive the vehicle onto the lane; to initially position the vehicle; to turn on the normal headlights: to turn on the high beams, and the like. It may also display appropriate indications that the test has been completed and that the car can be driven forward out of the test area. It may further be utilized to provide headlight replacement or alignment instructions to the operator.

The necessary reference values and algorithms for computation purposes may be stored upon storage device 44, which may be a hard disc. Test results data may also be stored thereon. Preferably, the processor 38 is a personal computer microprocessor, configured as known in the art to conduct the appropriate routines.

Typically, processor 38 includes input and output means, such as a keyboard and monitor and/or printer, whereby specific vehicle information may be loaded and test output displayed. To facilitate the test procedures, however, a remote hand-held transmitter 46 may be utilized in conjunction with receiver 48, which is coupled to the processor to allow the test operator to initiate and control test procedures from a remote location. This would allow, for example, the operator to be positioned in the vehicle under test while the test routine is performed. As shown in FIG. 4, the processor can also control the positioning of the target 16 through means 50, such as a reversible motor drive. This allows the operator positioned in the vehicle to close the doors 18, 20 to commence the test procedure and to open the doors to permit driving of the vehicle out of the test bay without leaving the vehicle.

It is to be recognized by those skilled in the art that modifications and adaptations of the invention as specifically disclosed herein may be accomplished without departure from the spirit or scope of the invention, which is to be measured by the annexed claims.

I claim:

1. Apparatus for testing the intensity and alignment of headlights on a vehicle, comprising
    a target screen positionable in front of the vehicle to receive an illumination pattern from the headlights to be tested;
    means for positioning said target screen in front of the vehicle in response to a target signal;
    means mounted to said target screen for providing a plurality of reference images thereon;
    a first video camera focused on said target screen to provide an image of said target screen illumination pattern and said reference images;
    a second video camera focused on the headlight portion of said vehicle to provide an image thereof; and
    means operatively coupled to said video cameras for receiving said target screen image and said headlight portion image and processing said images to determine the intensity and alignment of the headlights.

2. The apparatus of claim 1, wherein said receiving and processing means comprise means for generating a digital representation of at least said target screen image and means for analyzing said digital representation.

3. The apparatus of claim 2, wherein said processing means comprise a microcomputer.

4. The apparatus of claim 1, wherein said reference images comprise both position and intensity reference images.

5. The apparatus of claim 4, further comprising a plurality of light sources mounted upon said target to generate said reference images.

6. The apparatus of claim 1 further comprising a video monitor mounted in a position observable from the driver's position of the vehicle and means coupling said monitor to said processing means to permit instructions and data relating to said intensity and alignment determination to be displayed on said monitor.

7. The apparatus of claim 6 further comprising wireless control means to generate said control signal and to control operation of said processing means.

8. The apparatus of claim 6 further comprising means coupled to said processing means for determining the orientation of the vehicle with respect to said target screen and generating an output signal in accordance therewith.

9. The apparatus of claim 8, wherein at least one portion of said output signal is a message displayed on said monitor.

10. The apparatus of claim 8, wherein said orientation determining means comprise means for determining the distance of said vehicle from known reference points located along the sides of said vehicle.

11. The apparatus of claim 10, wherein said means for determining distance comprise pairs of optical sensors arrayed on opposite sides of the vehicle.

12. A method for testing the alignment and intensity of vehicle headlights, comprising the steps of:

i. positioning the vehicle with respect to a target screen such that at least one headlight projects an image thereon and generating a location signal corresponding to the orientation of said vehicle with respect to said target screen;

ii. generating a plurality of reference images of known position and intensity on said target screen;

iii. producing a first video image of said target screen including said headlight and reference images;

iv. producing a second video image of at least the headlight portion of said vehicle; and v. analyzing said location signal and said first and second video image to determine the intensity and alignment of said at least one headlight.

13. The method of claim 12, wherein said positioning step further comprises the step of generating a message to advise the vehicle operator when positioning is within predetermined guidelines.

14. The method of claim 12, wherein said analyzing step comprises the steps of digitizing said video images and comparing the digitized representation of the image of said headlights on said target screen with the digitized representation of said position and intensity images.

15. The method of claim 12 further comprising the step of displaying the results of said analysis on a monitor observable from the interior of the vehicle under test.

16. The method of claim 12 wherein said location signal generation step comprises the step of generating said location signal as part of said second video image.

17. The method of claim 12 wherein said location signal generation step comprises the step of measuring the distance to said vehicle from known points adjacent the vehicle.

* * * * *